US006356281B1

(12) United States Patent
Isenman

(10) Patent No.: US 6,356,281 B1
(45) Date of Patent: Mar. 12, 2002

(54) METHOD AND APPARATUS FOR DISPLAYING TRANSLUCENT OVERLAPPING GRAPHICAL OBJECTS ON A COMPUTER MONITOR

(75) Inventor: Colin C. Isenman, London (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/386,033

(22) Filed: Feb. 9, 1995

(30) Foreign Application Priority Data

Sep. 22, 1994 (GB) ........................................... 9419126

(51) Int. Cl.[7] ............................................... G06F 15/00
(52) U.S. Cl. ....................................................... 345/629
(58) Field of Search .......................... 395/135; 345/113, 345/114, 435, 443, 444, 419, 426, 427, 428, 629, 630, 631, 632

(56) References Cited

U.S. PATENT DOCUMENTS 4,868,765 A * 9/1989 Diefendorff ................ 364/521

FOREIGN PATENT DOCUMENTS

EP 605945 7/1994
EP 615223 9/1994

OTHER PUBLICATIONS

IBM Technical Disclosure Bulletin, vol. 36, No. 06A, Jun. 1993, New York US, pp. 135–136, XP000372380 "Translucent Window Attribute".

IBM Technical Disclosure Bulletin, vol. 37, No. 06A, Jun. 1994, New York US, pp. 251–255, XP000455762 "Non–Opaque Selection Method for Concealed Window Resources".

GUI, "Graphic User Interface", Research Disclosure, Mar. 1993, p 1–2.*

* cited by examiner

*Primary Examiner*—Phu K. Nguyen
(74) *Attorney, Agent, or Firm*—Gates & Cooper

(57) ABSTRACT

A method and apparatus for displaying translucent, overlapping graphical objects, e.g., windows, on a computer monitor. In the system, a graphical representation of a first object is displayed on the monitor of the computer. Then, a graphical representation of a second object is displayed on the monitor overlaying and obscuring at least a portion of the first object. The system displays a vestigial representation of a portion of the first object obscured by the second object through the second object. Typically, the vestigial representation comprises an outline of the object, although other graphical representations could also be used. Moreover, multiple such overlapping objects may be displayed on the monitor in a similar manner. The system accepts a command from the user to identify and designate a lower level object as a top level object. In pen-based PCs, the command is a pen gesture, and preferably, the drawing of the Greek "gamma" character or γ.

30 Claims, 3 Drawing Sheets

METHOD AND APPARATUS FOR DISPLAYING TRANSLUCENT OVERLAPPING GRAPHICAL OBJECTS ON A COMPUTER MONITOR

BACKGROUND OF THE INVENTION

1. Field of the Invention

The present invention generally relates to graphical user interfaces for computer systems, and in particular, to a method and apparatus for displaying translucent, overlapping graphical objects on a computer monitor.

2. Description of Related Art

Current windowing systems are opaque in that only the top level window is visible, and other levels are partially or fully obscured by the top level window. Usually the top level window is the active window in the system, although the lower level windows may operate in the background.

The obscuring of windows leads to several problems for novice users. One problem is that the lower level windows can partially or completely vanish from sight of the user, and thus may appear to be lost. Another problem is that the user may be involved in the continuous actions of re-sizing windows and entering relatively convoluted mouse operations to change the top window from one application to another application.

SUMMARY OF THE INVENTION

To overcome the limitations in the prior art described above, and to overcome other limitations that will become apparent upon reading and understanding the present specification, the present invention discloses a method and apparatus for displaying translucent, overlapping graphical objects, e.g., windows, on a computer monitor. In the system, a graphical representation of a first object is displayed on the monitor of the computer. Then, a graphical representation of a second object is displayed on the monitor overlaying and obscuring at least a portion of the first object. The system displays a vestigial representation of a portion of the first object obscured by the second object through the second object. Typically, the vestigial representation comprises an outline of the object, although other graphical representations could also be used. Moreover, multiple such overlapping objects may be displayed on the monitor in a similar manner. The system accepts a command from the user to identify and designate a lower level object as a top level object. In pen-based PCs, the command is a pen gesture, and preferably, the drawing of the Greek "gamma" character or γ.

An object of the present invention is to display translucent, overlapping graphical objects on a monitor so that all levels of objects are visible to the user. This allows the user to see all levels of objects at the same time, and thus prevents the user from "losing" a lower level object.

Another object of the present invention is to reduce or eliminate the need for the user to continually re-size objects, move objects, or enter relatively convoluted mouse operations to change the top level object when operating the computer.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
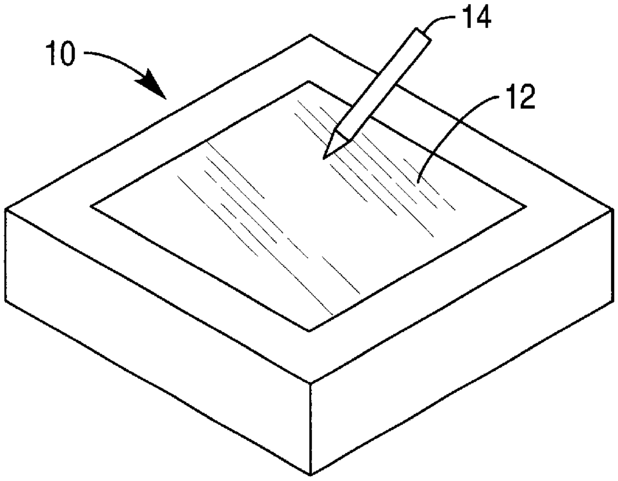
FIG. 1 illustrates one possible embodiment of the hardware comprising the present invention.

FIG. 1 illustrates one possible embodiment of the hardware comprising the present invention. The present invention operates on personal computer (PC) 10, e.g., a pen-based personal computer. The pen-based PC 10 preferably comprises a flat package consisting of a visible screen display combined with a digitizer input surface 12 and a stylus 14. The user writes on the screen/digitizer 12 as though it was a piece of paper. In response, the pen-based PC 10 displays information on the screen/digitizer 12.

Figure 2:
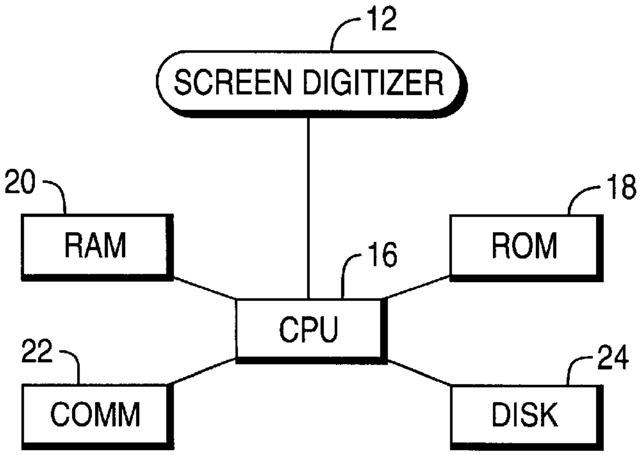
FIG. 2 illustrates one possible embodiment of the electronic components comprising the present invention.

FIG. 2 illustrates one possible embodiment of the electronic components comprising the present invention. The pen-based PC 10 preferably comprises a central processing unit (CPU) 16 coupled to read-only memory (ROM) 18, random access memory (RAM) 20, communications interfaces 22 and secondary storage, i.e., disks 24. Optionally, the pen-based computer 10 may also have removable memory, a data interface, or a printer.

In the preferred embodiment of present invention, the pen-based PC 10 operates under the control of the Microsoft WINDOWSÔ Version 3.1 operating environment. However, the present specification does not go into details on how the Microsoft WINDOWSÔ operating environment works nor how to program in the environment, as these details are well known in the art. The present specification assumes that the reader has an understanding of basic concepts within the Microsoft WINDOWSÔ operating environment, such as selecting objects, editing text, working with menus and dialog boxes, etc.

Figure 3:
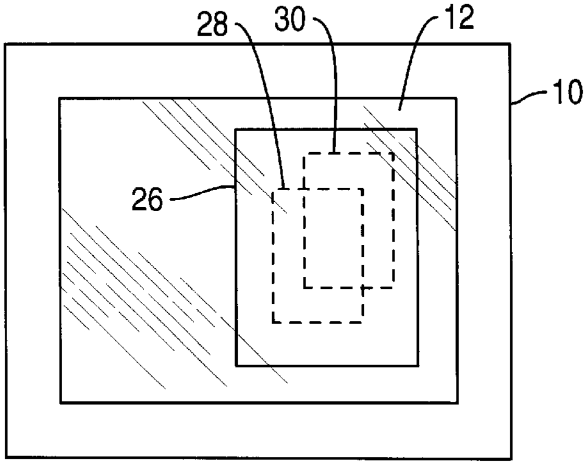
FIG. 3 illustrates a windowing graphical user interface displayed according to the present invention.

FIG. 3 illustrates a windowing graphical user interface displayed according to the present invention on the screen/digitizer 12 of the pen-based PC 10. In the example of FIG. 3, three objects, i.e., windows 26, 28 and 30, are displayed on the screen/digitizer 12 in a cascaded manner. Those skilled in the art will recognize that the present invention need not be restricted to windows, but instead has application to any type of graphical object displayed on a computer monitor. The top level or foreground window 26 is typically the active window in the system, although the lower level windows 28 and 30 may be operating in the background. The obscured outlines or boundaries of the background windows 28 and 30 are displayed in a vestigial manner, e.g., as "dotted" outlines or in some similar graphical manner.

Figure 4A:
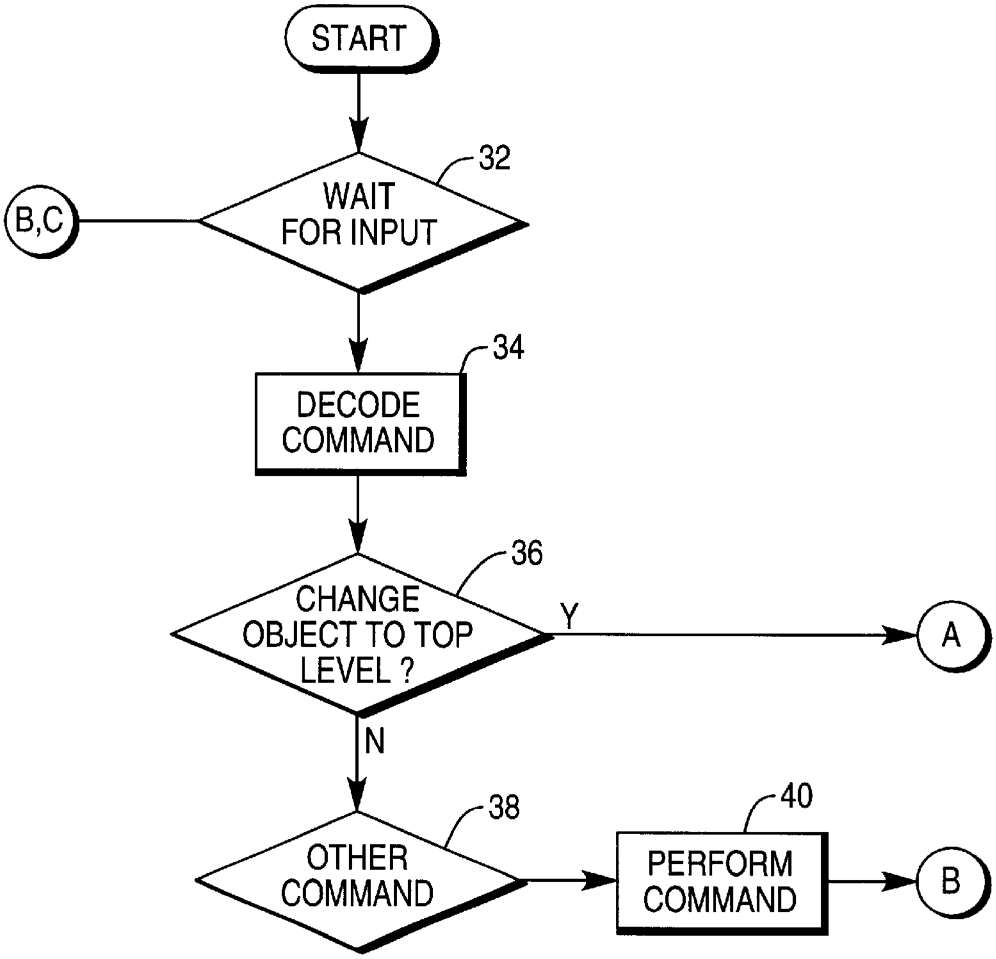
FIGS. 4A and 4B together are a flow chart defining the overall logic of the computer program which directs the operation of the present invention.
Figure 4B:
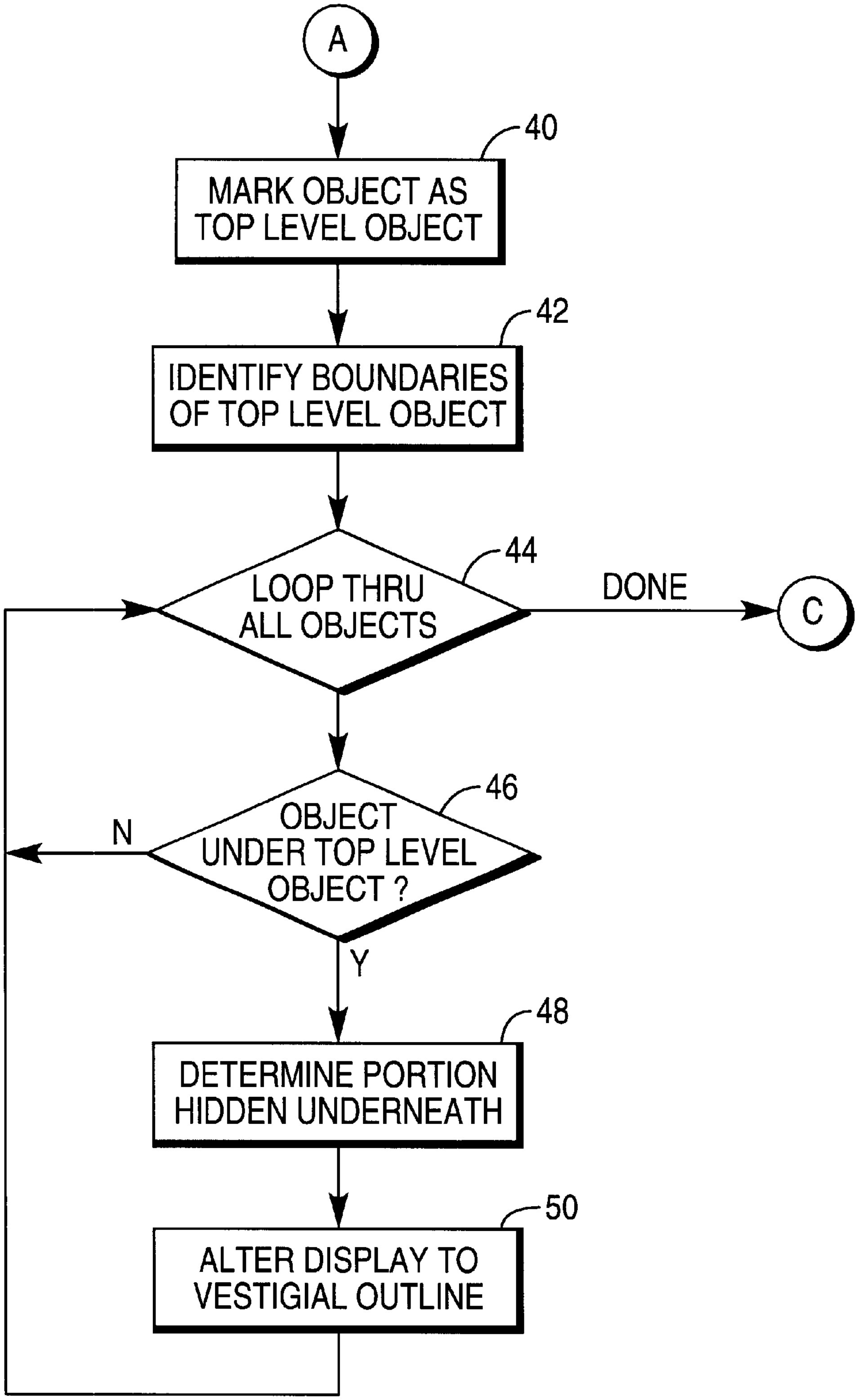

FIGS. 4A and 4B together are a flow chart defining the overall logic of the computer program which directs the operation of the present invention. Block 32 represents the wait for input from the operator. Block 34 represents the decoding of the input. In the preferred embodiment, the input includes not only the identity of the command entered by the user, but the location of the stylus 14 on the screen/digitizer 12 of the pen-based PC 10 as well.

Block 36 is a decision block that determines if the command entered by the operator is one that changes an object to the top level or foreground state. In one embodiment, a Greek "gamma" character, represented by the pen gesture γ drawn on the screen/digitizer 12, is used to indicate that the object so marked is to become the top level object. If no object is marked by the stylus 14 when this command is entered, then the layering of objects is cycled and the bottom-most object is brought to the top level, and the other objects are sequentially rotated to the bottom-most level. Of course, those skilled in the art will recognize that other commands or gestures could be used instead of the γ command and that other methods of identifying objects or cycling objects through levels could be substituted for the described method without departing from the scope of the present invention.

If the command entered by the operator is not one that changes an object to the top level or foreground state, then control transfers to blocks 38 and 40, which represent the identification and execution of other operator commands, and thereafter to block 32 to await user input again. Otherwise, control transfers via "A" to block 40.

Block 40 represents the object being "marked" as the top level object. Block 42 identifies the boundaries of the displayed representation of the top level object on the screen/digitizer 12. Block 44 represents a loop to search through all objects in the system. Block 46 is a decision block that determines whether the object found in the search is partially or totally obscured by the top level object. If not, then control transfers to block 44 to search again. However, if some portion of the object is obscured by the top level object, then block 46 determines what portion of the object is hidden underneath the top level object and block 48 alters the display of the object to show a vestigial outline for the obscured portion of the object. Once all objects have been searched, control transfers back to block 32 via "C".

In one embodiment, the vestigial outlines only apply to objects hidden underneath the top level object. However, in an alternative embodiment, where there are multiple layers of objects, the present invention allows vestigial outlines of lower level objects to show through higher level objects that are not the top level object. Such an embodiment requires multiple traversals of blocks 40–48 identifying different "top level" objects at each traversal until all objects had been processed. Of course, those skilled in the art will recognize that other methods of identifying higher level and lower level objects or cycling objects through the levels could be substituted for the described method without departing from the scope of the present invention.

This concludes the description of the preferred embodiment of the invention. The following paragraphs describe some alternative methods of accomplishing the same objects.

Although the preferred embodiment has been described in terms of a pen-based PC, those skilled in the art will recognize that other hardware configurations could also be used with the present invention. For example, a desktop or laptop PC using a pointing device such as a mouse, touch-screen, or light pen could be used in place of the pen-based PC described above.

Another alternative embodiment arranges the background windows around the edge of the top level window in such a way that the user can easily select the different windows. The initial gesture used to bring the lower level window to the top level could also "hook" or re-position the window to the center of the monitor at the same time.

Still another alternative embodiment would extend the idea of hooking a window by having it apply to the current active window, thus eliminating the scroll bars which are a common part of mouse-driven windowing systems.

Yet another alternative embodiment arranges the above extensions in such a way that video memory, or main memory if fast transfer exists, contains significant pieces of the lower level windows to improve the speed of activation.

Still yet another embodiment provides a facility to switch the invention (or any of its features) on or off at the user's discretion.

In summary, a method and apparatus is disclosed for displaying translucent, overlapping graphical objects, e.g., windows, on a computer monitor. In the system, a graphical representation of a first object is displayed on the monitor of the computer. Then, a graphical representation of a second object is displayed on the monitor overlaying and obscuring at least a portion of the first object. The system displays a vestigial representation of a portion of the first object obscured by the second object through the second object. Typically, the vestigial representation comprises an outline of the object, although other graphical representations could also be used. Moreover, multiple such overlapping objects may be displayed on the monitor in a similar manner. The system accepts a command from the user to identify and designate a lower level object as a top level object. In pen-based PCs, the command is a pen gesture, and preferably, the drawing of the Greek "gamma" character or γ.

The use of these translucent, overlapping objects provides several advantages. One advantage is that the lower level objects do not vanish from sight of the user, and thus are never "lost" to the novice user. Another advantage is that the user need not continually re-size windows, move windows, or enter relatively convoluted mouse operations to change the top level window from one application to another application.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of displaying information in a computer having a monitor attached thereto, comprising the steps of:

(a) displaying a graphical representation of a first object on the monitor of the computer;

(b) displaying a graphical representation of a second object on the monitor of the computer overlaying and obscuring at least a portion of the first object;

(c) altering the graphical representation of the obscured portion of the first object to create a vestigial representation thereof; and (d) displaying the vestigial representation of the obscured portion of the first object through the second object.

2. The method as set forth in claim 1 above, further comprising the steps of:

(e) displaying a graphical representation of a third object on the monitor of the computer overlaying and obscuring at least a portion of the second object;

(f) altering the graphical representation of the obscured portion of the second object to create a vestigial representation thereof; and (g) displaying the vestigial representation of the obscured portion of the second object through the third object.

3. The method as set forth in claim 2 above, further comprising the step of displaying the vestigial representation of the obscured portion of the first object through the third object.

4. The method as set forth in claim 1 above, further comprising the step of entering a command to the computer to designate a lower level object as a top level object.

5. The method as set forth in claim 4 above, wherein the command is a pen gesture.

6. The method as set forth in claim 4 above, wherein the step of entering a command further comprises the step of cycling the objects in response to the entered command.

7. The method as set forth in claim 6 above, wherein the step of cycling further comprises the steps of designating the lower-level object as the top level object and sequentially rotating other objects to a position as the lower-level object.

8. The method as set forth in claim 1 above, wherein the top level object executes in the foreground of the system.

9. The method as set forth in claim 8 above, wherein the lower level objects execute in the background of the system.

10. The method as set forth in claim 1 above, wherein the vestigial representation comprises an outline of the object.

11. An apparatus for displaying information in a computer with a monitor attached thereto, comprising:

(a) means, performed by the computer, for displaying a graphical representation of a first object on the monitor;

(b) means, performed by the computer, for displaying a graphical representation of a second object on the monitor overlaying and obscuring at least a portion of the first object;

(c) means performed by the computer, for altering the graphical representation of the obscured portion of the first object to create a vestigial representation thereof; and (d) means, performed by the computer, for displaying the vestigial representation of the obscured portion of the first object through the second object.

12. The apparatus as set forth in claim 11 above, further comprising:

(e) means, performed by the computer, for displaying a graphical representation of a third object on the monitor overlaying and obscuring at least a portion of the second object;

(f) means, performed by the computer, for altering the graphical representation of the obscured portion of the second object to create a vestigial representation thereof; and (g) means, performed by the computer, for displaying the vestigial representation of the obscured portion of the second object through the third object.

13. The apparatus as set forth in claim 12 above, further comprising means, performed by the computer, for displaying the vestigial representation of the obscured portion of the first object through the third object.

14. The apparatus as set forth in claim 11 above, further comprising means, performed by the computer, for entering a command to the computer to designate a lower level object as a top level object.

15. The apparatus as set forth in claim 14 above, wherein the command is a pen gesture.

16. The apparatus of claim 14 above, wherein the means for entering a command further comprises means for cycling the objects in response to the entered command.

17. The apparatus of claim 16 above, wherein the means for cycling further comprises means for designating the lower-level object as the top level object and sequentially rotating other objects to a position as the lower-level object.

18. The apparatus as set forth in claim 11 above, wherein the top level object executes in the foreground of the system.

19. The apparatus as set forth in claim 18 above, wherein the lower level objects execute in the background of the system.

20. The apparatus as set forth in claim 11 above, wherein the vestigial representation comprises an outline of the object.

21. A program storage medium readable by a computer having a monitor attached thereto, the medium tangibly embodying one or more programs of instructions executable by the computer to perform method steps for graphically displaying information in one or more windows on the monitor attached to a computer, the method comprising the steps of:

(a) displaying a graphical representation of a first object on the monitor of the computer;

(b) displaying a graphical representation of a second object on the monitor of the computer overlaying and obscuring at least a portion of the first object;

(c) altering the graphical representation of the obscured portion of the first object to create a vestigial representation thereof; and (d) displaying the vestigial representation of the obscured portion of the first object through the second object.

22. The program storage medium of claim 21, further comprising the steps of:

(d) displaying a graphical representation of a third object on the monitor of the computer overlaying and obscuring at least a portion of the second object;

(e) altering the graphical representation of the obscured portion of the second object to create a vestigial representation thereof; and (f) displaying the vestigial representation of the obscured portion of the second object through the third object.

23. The program storage medium of claim 22, further comprising the step of displaying the vestigial representation of the obscured portion of the first object through the third object.

24. The program storage medium of claim 21, further comprising the step of entering a command to the computer to designate a lower level object as a top level object.

25. The program storage medium of claim 24 above, wherein the command is a pen gesture.

26. The program storage medium of claim 24 above, wherein the step of entering a command further comprises the step of cycling the objects in response to the entered command.

27. The program storage medium of claim 26 above, wherein the step of cycling further comprises the steps of designating the lower-level object as the top level object and sequentially rotating other objects to a position as the lower-level object.

28. The program storage medium of claim 21 above, wherein a top level object executes in the foreground of the system.

29. The program storage medium of claim 28 above, wherein lower level objects execute in the background of the system.

30. The program storage medium of claim 21 above, wherein the vestigial representation comprises an outline of the object.

* * * * *